United States Patent
Pan

(10) Patent No.: US 8,456,776 B1
(45) Date of Patent: Jun. 4, 2013

(54) DISK DRIVE HEAD GIMBAL ASSEMBLY HAVING A FLEXURE BOND PAD SHELF OFFSET FROM A TONGUE

(75) Inventor: Tzong-Shii Pan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 21 days.

(21) Appl. No.: 13/207,308

(22) Filed: Aug. 10, 2011

Related U.S. Application Data

(60) Provisional application No. 61/385,484, filed on Sep. 22, 2010.

(51) Int. Cl.
*G11B 5/02* (2006.01)

(52) U.S. Cl.
USPC ........... 360/59; 360/245; 360/245.3; 369/100

(58) Field of Classification Search
USPC .............. 360/245.8–245.9, 234.5–234.6, 59, 360/245, 245.3
See application file for complete search history.

(56) References Cited

U.S. PATENT DOCUMENTS

| | | | |
|---|---|---|---|
| 5,873,159 A | 2/1999 | Arya et al. | |
| 6,404,706 B1 | 6/2002 | Stovall et al. | |
| 6,549,506 B1 | 4/2003 | Johnson et al. | |
| 6,856,487 B1 * | 2/2005 | Mei et al. | 360/244.8 |
| 7,002,780 B2 | 2/2006 | Rancour et al. | |
| 7,113,372 B2 | 9/2006 | Segar et al. | |
| 7,298,590 B1 * | 11/2007 | Mei | 360/245.7 |
| 7,345,840 B2 | 3/2008 | Gomez et al. | |
| 7,532,435 B2 | 5/2009 | Dugas et al. | |
| 7,538,979 B2 * | 5/2009 | Hagen | 360/245.3 |
| 7,551,399 B2 * | 6/2009 | Kido et al. | 360/244.3 |
| 7,667,930 B1 * | 2/2010 | Wang | 360/245.3 |
| 8,064,168 B1 * | 11/2011 | Zhang et al. | 360/245.4 |
| 8,276,256 B1 * | 10/2012 | Zhang et al. | 29/603.06 |
| 2004/0066585 A1 * | 4/2004 | Shum | 360/294.4 |
| 2004/0120078 A1 * | 6/2004 | Berding et al. | 360/245.9 |
| 2004/0130825 A1 * | 7/2004 | Danielson et al. | 360/244.8 |
| 2007/0086115 A1 * | 4/2007 | Harris et al. | 360/245.3 |
| 2008/0043360 A1 * | 2/2008 | Shimazawa et al. | 360/59 |
| 2009/0021857 A1 * | 1/2009 | Shelor | 360/77.16 |
| 2009/0266789 A1 * | 10/2009 | Shimazawa et al. | 216/22 |
| 2010/0002332 A1 | 1/2010 | Dugas et al. | |
| 2010/0238581 A1 * | 9/2010 | Nakamura et al. | 360/59 |
| 2011/0026377 A1 * | 2/2011 | Shimazawa et al. | 369/13.24 |
| 2011/0228416 A1 * | 9/2011 | Sasaki et al. | 360/59 |

* cited by examiner

*Primary Examiner* — Wayne Young
*Assistant Examiner* — Brenda Bernardi

(57) ABSTRACT

A disk drive includes a head gimbal assembly with a laser light source that is disposed on a back face of the slider (opposite an air bearing surface). The laser light source is attached to the flexure tongue. The flexure includes a plurality of bends that offset a flexure bond pad shelf from a flexure tongue by an offset distance (measured in a direction that is normal to the air bearing surface). The offset distance may be approximately equal to the thickness of the laser light source. A plurality of flexure bond pads on flexure bond pad shelf is electrically connected to respective ones of a plurality of head bond pads.

17 Claims, 7 Drawing Sheets

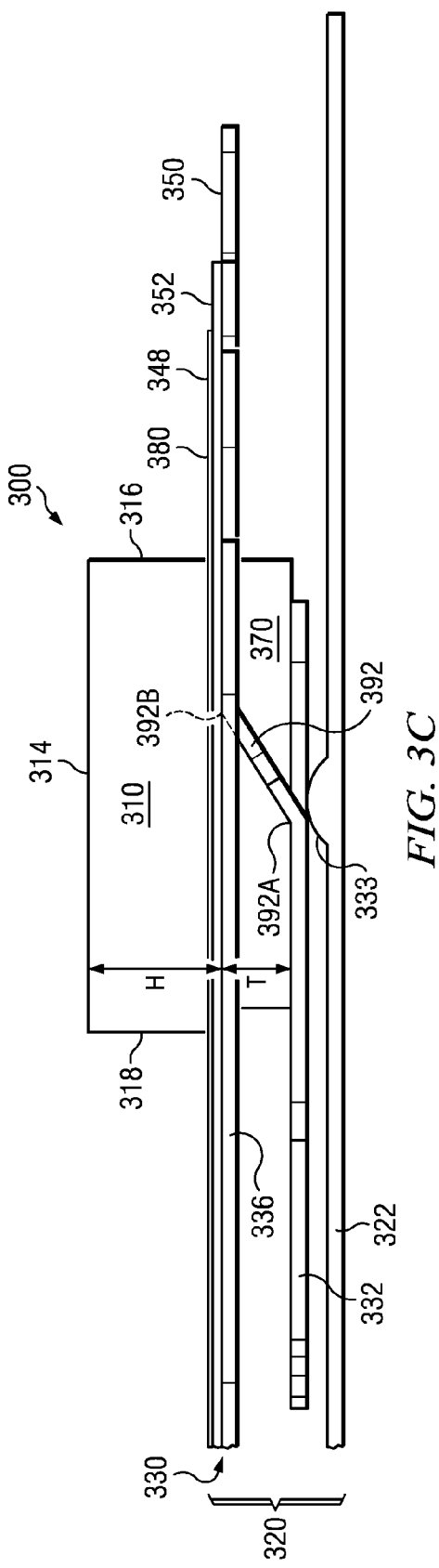
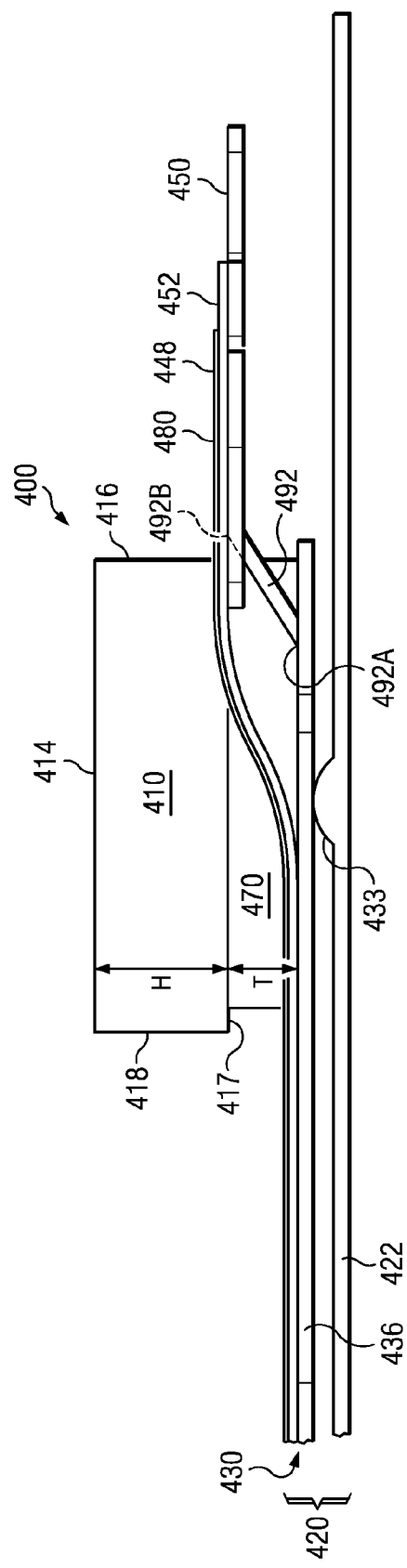
FIG. 3C
FIG. 4C

DISK DRIVE HEAD GIMBAL ASSEMBLY HAVING A FLEXURE BOND PAD SHELF OFFSET FROM A TONGUE

CROSS-REFERENCE TO RELATED APPLICATIONS

The present application claims priority from co-pending provisional U.S. Patent Application Ser. No. 61/385,484, filed on Sep. 22, 2010, the specification of which is incorporated herein by reference.

BACKGROUND

Magnetic hard disk drives retrieve and/or store data in computers and other consumer electronics devices. A magnetic hard disk drive includes one or more heads that can read and write information on a corresponding magnetic surface of a spinning disk. Each head is a sub-component of a head gimbal assembly (HGA). The HGA also includes a suspension assembly for holding the head and providing a plurality of electrical connections thereto. The suspension assembly typically includes a fragile laminated flexure to carry the electrical signals to and from the head.

The head typically comprises a slider that includes an air bearing surface (ABS) that faces the magnetic disk surface, a trailing face, and a back face that is opposite the ABS and that faces away from the ABS. A magnetic sensor and a plurality of head bond pads are typically disposed on the trailing face of the slider. The back face of the slider is typically permanently bonded to a tongue portion of the fragile laminated flexure by an adhesive, in a position such that the plurality of head bond pads are aligned with corresponding bond pads on the laminated flexure.

Conventionally, the head writes tiny magnetic transitions on the magnetic disk surface by applying sufficient magnetic field to the desired microscopic disk surface location to overcome the coercivity of the disk surface material there, and thereby change the remnant field there. However, market demand for disk drives having ever higher data storage capacity has motivated investigation into the possible use of "energy assisted" magnetic recording (EAMR), in which writing is accomplished not only by local application of a magnetic field, but also by local application of laser light. EAMR may enable the writing of smaller transitions, and thereby increase the areal density of data stored on the disk surface.

Most proposed EAMR technologies require the addition of a laser light source on the head, for example bonded to the back face of the slider. However, the addition of a laser light source on the back face of the slider may interfere with bonding the back face of the slider to the tongue portion of the laminated flexure, and may result in misalignment of the plurality of head bond pads with respect to the corresponding bond pads on the laminated flexure. Accordingly, there is a need in the art for a disk drive suspension assembly for heads that include a laser light source for EAMR.

BRIEF DESCRIPTION OF THE DRAWINGS

FIG. 3C is a side view of the distal portion of FIG. 3A.

FIG. 4C is a side view of the distal portion of FIG. 4A.

DESCRIPTION OF EXAMPLE EMBODIMENTS

Figure 1:
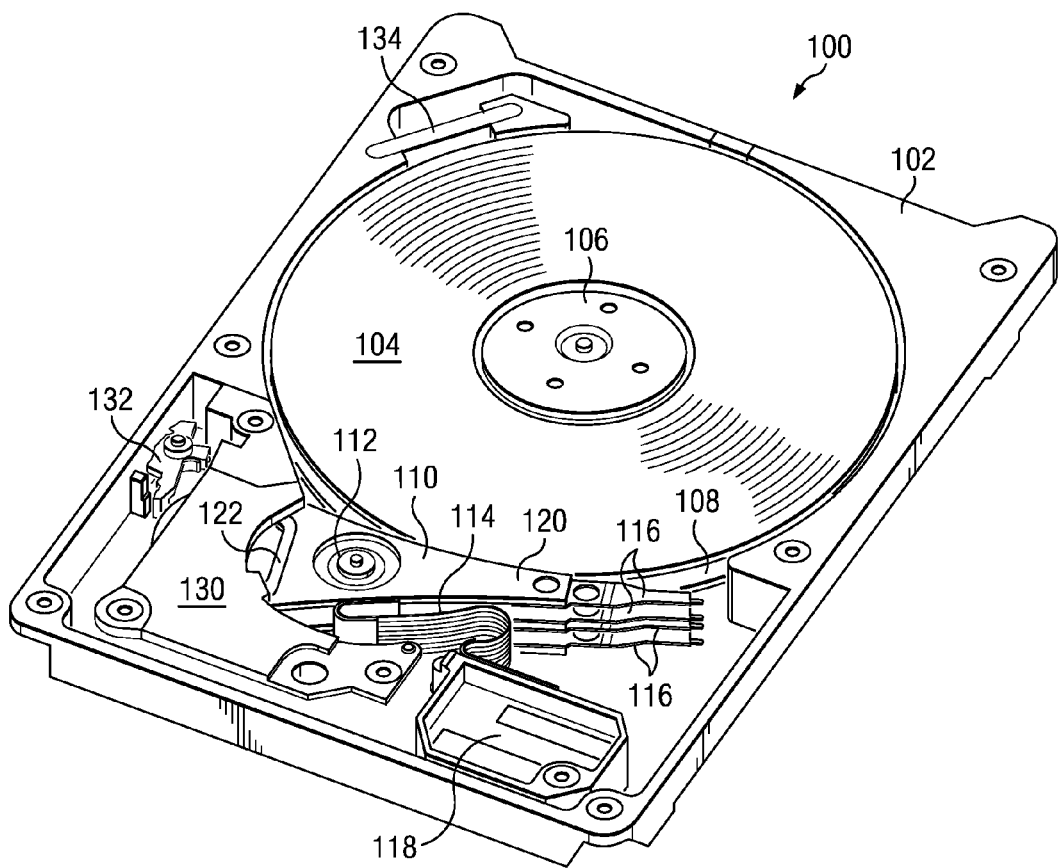
FIG. 1 is a perspective view of a disk drive capable of including an embodiment of the present invention.

FIG. 1 is a perspective view of a disk drive 100 capable of including an embodiment of the present invention. The disk drive 100 includes a disk drive base 102, and a disk 104 rotably mounted to the disk drive base 102 by a spindle motor 106. The disk drive 100 optionally includes a second disk 108, also rotably mounted to the disk drive base 102 by spindle motor 106. In contemporary magnetic hard disk drive applications, the disks 104, 108 may comprise an aluminum, glass, or ceramic substrate, with the substrate being coated with a NiP under-layer, a thin-film magnetic layer, a diamond-like amorphous carbon protective layer, and a very thin lubricant layer. Co-rotation of the disks 104, 108 can induce air flow through a recirculation filter 134 that may reduce particulate contamination of the surfaces of the disks 104, 108.

The disk drive 100 also includes an actuator 110 that is rotably mounted to the disk drive base 102 by a pivot bearing 112 that is inserted as a cartridge into a bore in the actuator 110. The actuator 110 is typically fabricated from aluminum, magnesium, beryllium, or stainless steel. The pivot bearing 112 is typically retained in the bore by a tolerance ring but may be otherwise retained (e.g. by an adhesive). The angular range of motion of the actuator 110 may be limited by a latch and crash stop mechanism 132. The actuator 110 includes at least one actuator arm 120 that extends away from the pivot bearing 112, and an actuator coil 122 that extends away from the pivot bearing 112 in a direction generally opposite the actuator arm 120. A portion of the actuator coil 122 is obscured behind a top plate 130 of a yoke structure of a voice coil motor (VCM) in the view of FIG. 1.

The top plate 130 may support an upper permanent magnet of the VCM, and may be disposed over a bottom plate (not shown because obscured by the top plate 130 in the view of FIG. 1) that may support a lower permanent magnet of the VCM. The top plate 130 and/or the bottom plate form a yoke and preferably comprise a ferromagnetic metal so as to provide a return path for magnetic flux from the permanent magnet(s). The ferromagnetic metal yoke structure including the top plate 130 is preferably affixed to the disk drive base 102, for example by an adhesive, one or more fasteners, and/or magnetic attraction.

A plurality of head gimbal assemblies 116 is attached to arms of the actuator 110, for example by swaging. A flexible printed circuit (FPC) 114 (also known as a "flex cable") is also attached to the actuator 110. Each of the head gimbal assemblies 116 includes a laminated flexure having a flexure tail that is electrically connected to the FPC 114. The FPC 114 can communicate electrical signals, via these electrical connections and via a flex bracket 118, between the head gimbal assemblies 116 and an external electronic system that is disposed on a printed circuit board (not shown).

The actuator 110, head gimbal assemblies 116, and FPC 114 may be collectively referred to as a head stack assembly (HSA). The disk drive 100 may also include a conventional head loading ramp, that may be positioned adjacent the disks 104, 108 to facilitate merging of the head gimbal assemblies 116 onto surfaces of the disks 104, 108. However, such conventional ramp is not shown in FIG. 1 for a more clear view of the head gimbal assemblies 116.

Figure 2:
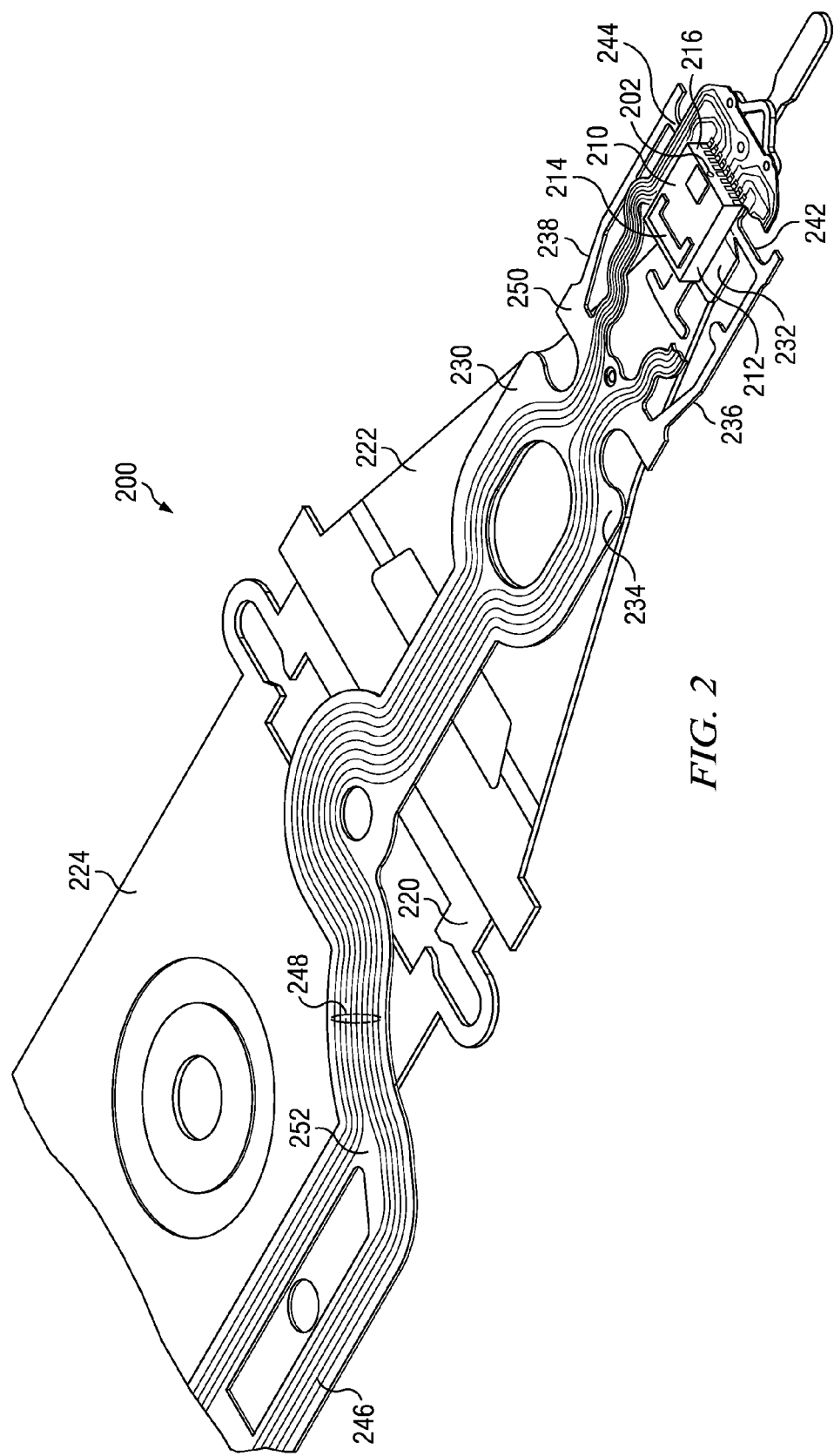
FIG. 2 depicts a head gimbal assembly (HGA), according to an embodiment of the present invention.

FIG. 2 depicts a head gimbal assembly (HGA) 200, according to an embodiment of the present invention. The HGA 200 includes a head 210 that comprises a slider 212 that includes an air bearing surface (ABS) 214 and a trailing face 216. The slider may comprise a ceramic material such as AlTiC, for example. The head 210 also comprises a magnetic sensor 202 that is disposed on the trailing face 216 of the slider 212. The magnetic sensor 202 may include a magneto-resistive read sensor and a magneto-inductive write transducer, for example.

In the embodiment of FIG. 2, the HGA 200 includes a suspension assembly 220 that may comprise a load beam 222, a swage plate 224, and a flexure 230. The flexure 230 includes a tongue 232. A first side of the tongue 232 may be in contact with the load beam 222, for example via a conventional dimple that transfers a preload force (also known as a "gram load") from the load beam 222 to the head 210 to preload the head 210 against the surface of a rotating disk during disk drive operation. The flexure 230 also includes a flexure base region 234 that is attached to the load beam 222, for example by spot welding the load beam 222 to a structural layer 250 of the flexure 230 in the flexure base region 234. The structural layer 250 of the flexure 230 may comprise stainless steel, for example.

In the embodiment of FIG. 2, the structural layer 250 of the flexure 230 includes a plurality of flexure arms 236, 238, each extending from the flexure base region 234 and adjoining to the flexure tongue 232 at a respective one of a plurality of adjoining locations 242, 244. The flexure 230 includes a flexure tail 246 that extends to connect with a flexible printed circuit (FPC) attached to an actuator. The flexure 230 also includes a plurality of conductive leads 248 that run from the flexure tail 246 to the head 210. The conductive leads 248 may comprise copper, for example. Note that in the view of FIG. 2, some of the conductive leads 248 have been cut away to better depict the tongue 232 and the adjoining location 242. A dielectric layer 252 separates the conductive leads 248 from the structural layer 250 of the flexure 230.

Figure 3A:
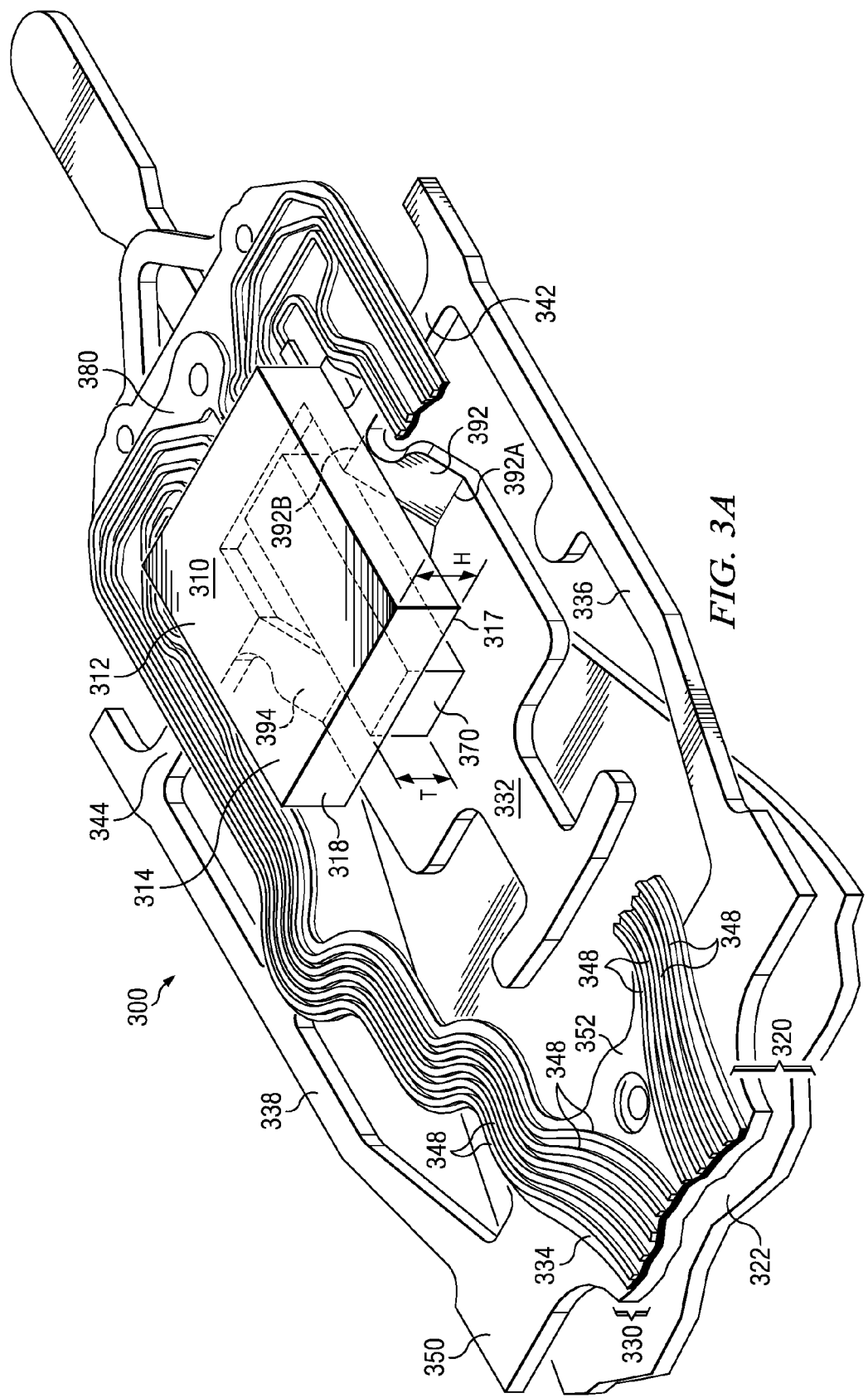
FIG. 3A is a front perspective view of a distal portion of a HGA, according to an embodiment of the present invention.
Figure 3B:
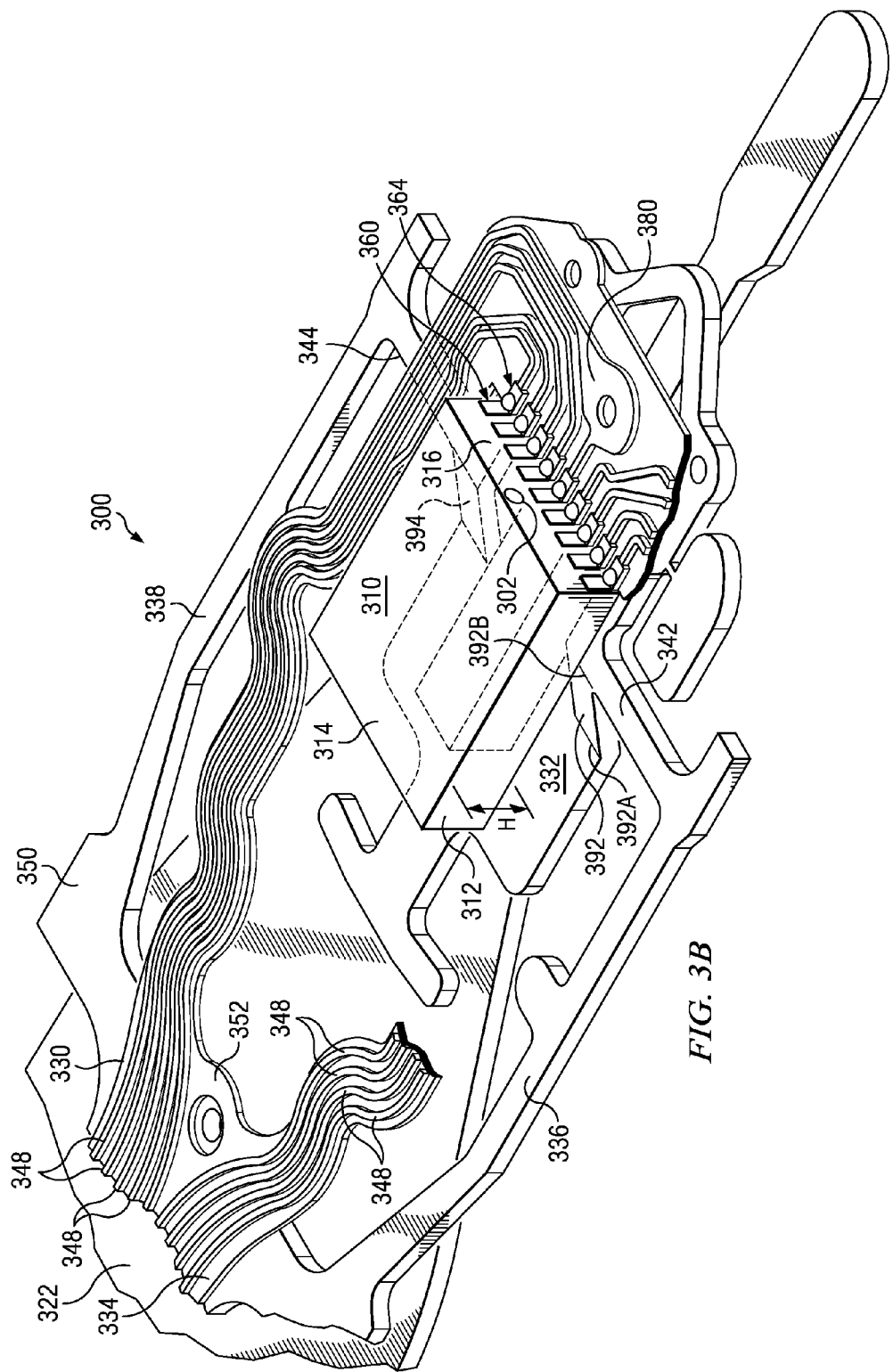
FIG. 3B is a rear perspective view of the distal portion of FIG. 3A.

FIG. 3A is a front perspective view of a distal portion of a HGA 300, according to an embodiment of the present invention. FIG. 3B is a rear perspective view of the distal portion of HGA 300, and FIG. 3C is a side view of the distal portion of HGA 300. Now referring to FIGS. 3A-C, the HGA 300 includes a head 310 that comprises a slider 312 that includes an air bearing surface (ABS) 314, a trailing face 316, and a leading face 318. The ABS 314 may be of conventional design, and detailed ABS features are not shown in FIGS. 3A and 3B so that the underlying structure shown in phantom lines will not be obscured or confused. The head 310 comprises a magnetic sensor 302 that is disposed on the trailing face 316 of the slider 312. The head 310 also comprises a plurality of head bond pads 360 that are disposed on the trailing face 316 and that are electrically conductive. The head bond pads 360 may comprise gold and/or copper, for example.

In the embodiment of FIGS. 3A-C, the HGA 300 includes a suspension assembly 320 that comprises a load beam 322 and a flexure 330. The flexure 330 includes a tongue 332. A first side of the tongue 332 (underside as viewed in FIGS. 3A-C) may be in contact with the load beam 322, for example via a conventional dimple 333 that transfers a preload force (also known as a "gram load") from the load beam 322 to the head 310 to preload the head 310 against the surface of a rotating disk during disk drive operation. An opposing second side of the tongue 332 (upperside as viewed in FIGS. 3A-C) may be attached to a laser light source 370. The flexure 330 also includes a flexure base region 334 that is attached to the load beam 322, for example by spot welding the load beam 322 to a structural layer 350 of the flexure 330 in the flexure base region 334. The structural layer 350 of the flexure 330 may comprise stainless steel, for example.

In the embodiment of FIGS. 3A-C, the structural layer 350 of the flexure 330 includes a plurality of flexure arms 336, 338, each extending from the flexure base region 334 and adjoining to the flexure tongue 332 at a respective one of a plurality of adjoining locations 342, 344. The flexure 330 also includes a plurality of conductive leads 348 that run from the flexure base region 334 to the head 310. The conductive leads 348 may comprise copper, for example. Note that in the view of FIGS. 3A and 3B, some of the conductive leads 348 have been cut away to better depict the tongue 332 and the adjoining location 342. A dielectric layer 352 separates the conductive leads 348 from the structural layer 350 of the flexure 330.

In the embodiment of FIGS. 3A-C, the slider 312 has a back face 317 that is opposite the ABS 314 and that faces away from the ABS 314. The HGA 300 includes the laser light source 370 that is disposed on the back face 317. The laser light source 370 defines a laser light source thickness T measured in a direction that is normal to the ABS 314. The laser light source thickness T is defined to include the thickness of any adhesive or other bonding agent that is used to attach the laser light source 370 to the back face 317 of the slider 312. In the embodiment of FIGS. 3A-C, the laser light source 370 is oriented to produce a laser beam that is substantially parallel to the back face 317, and the head 310 further includes a conventional reflective facet (not visible in these views) that bends the laser beam to be substantially normal to the ABS 314. For example, a conventional wave guide structure may include the reflective facet.

In the embodiment of FIGS. 3A-C, the flexure 320 includes a flexure bond pad shelf 380 that is approximately parallel to the tongue 332. A plurality of electrically conductive flexure bond pads 364 is disposed on the flexure bond pad shelf 380. The plurality of flexure bond pads 364 are electrically connected to respective ones of the plurality of head bond pads 360. The flexure includes a plurality of bends 392A, 392B offsetting the flexure bond pad shelf 380 from the tongue 332 by an offset distance measured in a direction that is normal to the ABS 314. In certain embodiments, the offset distance is preferably in the range 60 to 200 microns. Such range may, in certain embodiments, desirably align the head bond pads 360 with the flexure bond pads 364, with the laser light source 370 in a desired position.

In certain embodiments, the offset distance may be approximately equal to the laser light source thickness T (as shown in FIG. 3C), except with some difference due to manufacturing variation, and/or a difference corresponding to the thickness of one or two (of the three or more) sub-layers of the laminated flexure 330 (e.g. depending on whether the dielectric layer 352 and/or conductive trace layer 348 are present on the tongue 332). In certain embodiments, the offset distance may be no less than the laser light source thickness T. The slider 312 defines a slider height H measured from the ABS 314 to the back face 317 in a direction that is normal to the ABS 314. In certain embodiments, the offset distance is preferably no less than 30% of the slider height H. Such inequalities may, in certain embodiments, desirably align the head bond pads 360 with the flexure bond pads 364, with the laser light source 370 in a desired position.

In the embodiment of FIGS. 3A-C, the plurality of bends 392A, 392B are disposed between the flexure tongue 332 and the adjoining location 342. As can be seen in FIGS. 3A-C, each of the plurality of bends 392A, 392B is about a bend line that is oriented substantially parallel to the trailing face 316. Also, the plurality of bends 392A, 392B creates an inclined region 392 that connects the flexure tongue 332 to the adjoining location 342. Likewise, the inclined region 394 connects the flexure tongue 332 to the adjoining location 344. In the embodiment of FIGS. 3A-C, each of the plurality of adjoining locations 342, 344 is optionally shaped as a beam that is oriented substantially parallel to the trailing face 316.

Figure 4A:
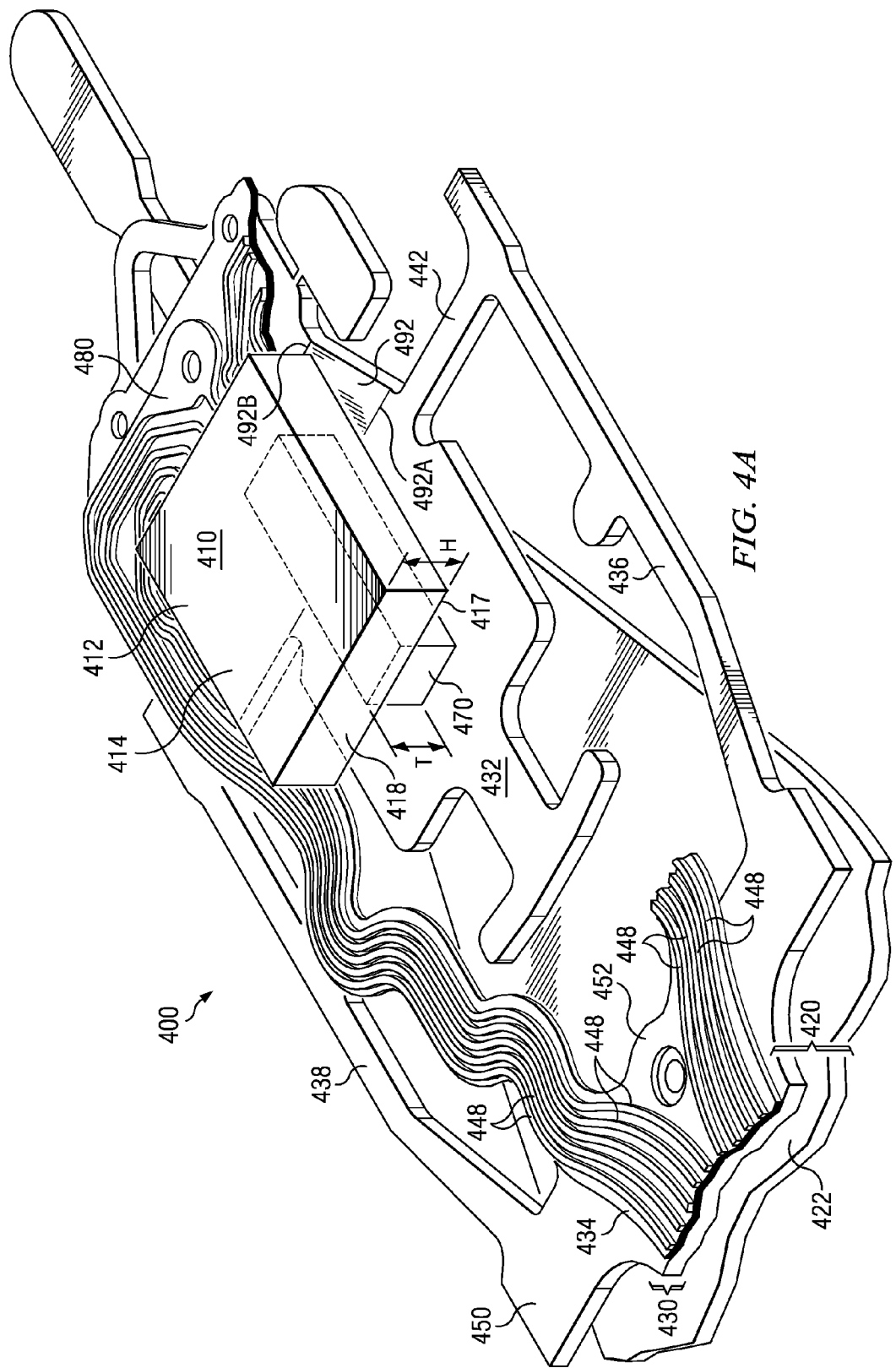
FIG. 4A is a front perspective view of a distal portion of a HGA, according to another embodiment of the present invention.
Figure 4B:
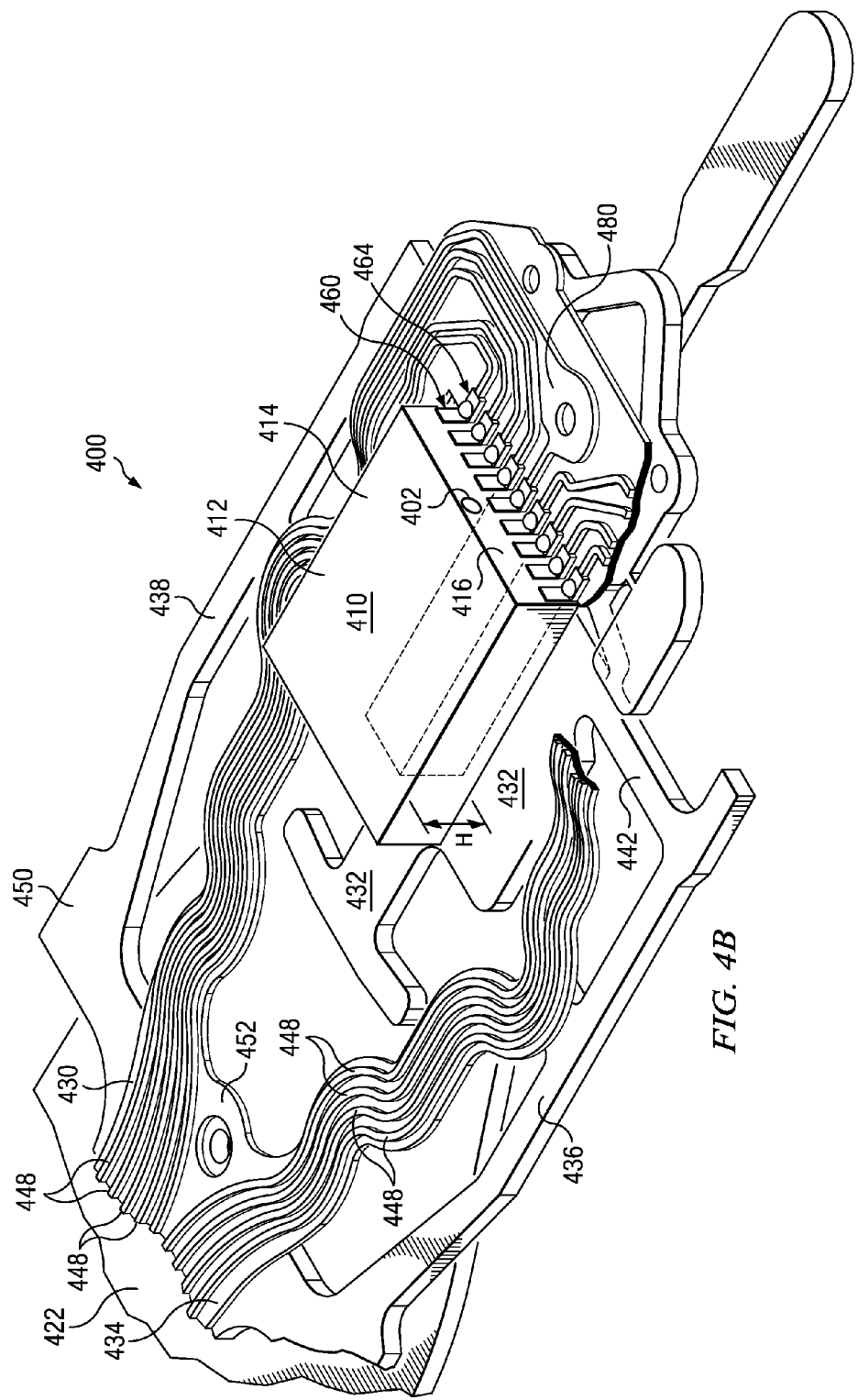
FIG. 4B is a rear perspective view of the distal portion of FIG. 4A.

FIG. 4A is a front perspective view of a distal portion of a HGA 400, according to another embodiment of the present invention. FIG. 4B is a rear perspective view of the distal portion of HGA 400, and FIG. 4C is a side view of the distal portion of HGA 400. Now referring to FIGS. 4A-C, the HGA 400 includes a head 410 that comprises a slider 412 that includes an air bearing surface (ABS) 414, a trailing face 416, and a leading face 418. The ABS 414 may be of conventional design, and detailed ABS features are not shown in FIGS. 4A and 4B so that the underlying structure shown in phantom lines will not be obscured or confused. The head 410 comprises a magnetic sensor 402 that is disposed on the trailing face 416 of the slider 412. The head 410 also comprises a plurality of head bond pads 460 that are disposed on the trailing face 416 and that are electrically conductive. The head bond pads 460 may comprise gold and/or copper, for example.

In the embodiment of FIGS. 4A-C, the HGA 400 includes a suspension assembly 420 that comprises a load beam 422 and a flexure 430. The flexure 430 includes a tongue 432. A first side of the tongue 432 (underside as viewed in FIGS. 4A-C) may be in contact with the load beam 422, for example via a conventional dimple 433 that transfers a preload force (also known as a "gram load") from the load beam 422 to the head 410 to preload the head 410 against the surface of a rotating disk during disk drive operation. An opposing second side of the tongue 432 (upperside as viewed in FIGS. 4A-C) may be attached to a laser light source 470. The flexure 430 also includes a flexure base region 434 that is attached to the load beam 422, for example by spot welding the load beam 422 to a structural layer 450 of the flexure 430 in the flexure base region 434. The structural layer 450 of the flexure 430 may comprise stainless steel, for example.

In the embodiment of FIGS. 4A-C, the structural layer 450 of the flexure 430 includes a plurality of flexure arms 436, 438, each extending from the flexure base region 434 and adjoining to the flexure tongue 432. For example, flexure arm 436 adjoins the flexure tongue at adjoining location 442. The flexure 430 also includes a plurality of conductive leads 448 that run from the flexure base region 434 to the head 410. The conductive leads 448 may comprise copper, for example. Note that in the view of FIGS. 4A and 4B, some of the conductive leads 448 have been cut away to better depict the tongue 432 and the adjoining location 442. A dielectric layer 452 separates the conductive leads 448 from the structural layer 450 of the flexure 430.

In the embodiment of FIGS. 4A-C, the slider 412 has a back face 417 that is opposite the ABS 414 and that faces away from the ABS 414. The HGA 400 includes the laser light source 470 that is disposed on the back face 417. The laser light source 470 defines a laser light source thickness T measured in a direction that is normal to the ABS 414. The laser light source thickness T is defined to include the thickness of any adhesive or other bonding agent that is used to attach the laser light source 470 to the back face 417 of the slider 412. In the embodiment of FIGS. 4A-C, the laser light source 470 is oriented to produce a laser beam that is substantially parallel to the back face 417, and the head 410 further includes a conventional reflective facet (not visible in these views) that bends the laser beam to be substantially normal to the ABS 414. For example, a conventional wave guide structure may include the reflective facet.

In the embodiment of FIGS. 4A-C, the flexure 420 includes a flexure bond pad shelf 480 that is approximately parallel to the tongue 432. A plurality of electrically conductive flexure bond pads 464 is disposed on the flexure bond pad shelf 480. The plurality of flexure bond pads 464 are electrically connected to respective ones of the plurality of head bond pads 460. The flexure includes a plurality of bends 492A, 492B offsetting the flexure bond pad shelf 480 from the tongue 432 by an offset distance measured in a direction that is normal to the ABS 314. In certain embodiments, the offset distance is preferably in the range 60 to 200 microns. Such range may, in certain embodiments, desirably align the head bond pads 460 with the flexure bond pads 464, with the laser light source 470 in a desired position.

In certain embodiments, the offset distance may be approximately equal to the laser light source thickness T (as shown in FIG. 4C), except with some difference due to manufacturing variation, and/or a difference corresponding to the thickness of one or two (of the three or more) sub-layers of the laminated flexure 430 (e.g. depending on whether the dielectric layer 452 and/or conductive trace layer 448 are present on the tongue 432). In certain embodiments, the offset distance may be no less than the laser light source thickness. The slider 412 defines a slider height H measured from the ABS 414 to the back face 417 in a direction that is normal to the ABS 414. In certain embodiments, the offset distance is preferably at least 30% of the slider height H. Such inequalities may, in certain embodiments, desirably align the head bond pads 460 with the flexure bond pads 464, with the laser light source 470 in a desired position.

In the embodiment of FIGS. 4A-C, the plurality of bends 492A, 492B are disposed between the flexure bond pad shelf 480 and the adjoining location 442. As can be seen in FIGS. 4A-C, each of the plurality of bends 492A, 492B is about a bend line that is oriented substantially parallel to the trailing face 416. Also, the plurality of bends 492A, 492B creates an inclined region 492 that connects the flexure bond pad shelf 480 to the adjoining location 442. In the embodiment of FIGS. 4A-C, the adjoining location 442 is optionally shaped as a beam that is oriented substantially parallel to the trailing face 416.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

I claim:
1. A disk drive comprising:
 a disk drive base;
 a disk rotably mounted to the disk drive base;
 an actuator rotably mounted to the disk drive base; and
 a head gimbal assembly attached to the actuator, the head gimbal assembly comprising
  a head that comprises a slider that includes an air bearing surface (ABS), a trailing face, and a back face that is opposite the ABS and that faces away from the ABS, the slider defining a slider height measured in a direction that is normal to the ABS;
a magnetic sensor that is disposed on the trailing face; and
a plurality of head bond pads that are disposed on the trailing face and that are electrically conductive; and
a laser light source that is disposed on the back face, the laser light source defining a laser light source thickness measured in the direction that is normal to the ABS; and
a suspension assembly that comprises
a load beam;
a flexure, the flexure including
a tongue, a first side of the tongue in contact with the load beam, and an opposing second side of the tongue attached to the laser light source; and
a flexure bond pad shelf that is approximately parallel to the tongue; and
a plurality of flexure bond pads that are disposed on the flexure bond pad shelf and that are electrically conductive,
wherein the plurality of flexure bond pads are electrically connected to respective ones of the plurality of head bond pads; and
wherein the flexure includes a plurality of bends offsetting the flexure bond pad shelf from the tongue by an offset distance measured in the direction that is normal to the ABS and being no less than 30% the slider height.

2. The disk drive of claim 1 wherein the flexure further comprises a flexure base region that is attached to the load beam, and a plurality of flexure arms, each extending from the flexure base region and adjoining to the flexure tongue at a respective one of a plurality of adjoining locations.

3. The disk drive of claim 2 wherein the plurality of bends are disposed between the flexure bond pad shelf and the plurality of adjoining locations.

4. The disk drive of claim 3 wherein each of the plurality of bends is about a bend line that is oriented substantially parallel to the trailing face.

5. The disk drive of claim 1 wherein the flexure further comprises a flexure base region that is attached to the load beam, and a plurality of flexure arms, each extending from the flexure base region and adjoining to the flexure bond pad shelf at a respective one of a plurality of adjoining locations.

6. The disk drive of claim 5 wherein the plurality of bends are disposed between the flexure tongue and the plurality of adjoining locations.

7. The disk drive of claim 6 wherein each of the plurality of bends is about a bend line that is oriented substantially parallel to the trailing face.

8. The disk drive of claim 1 wherein the offset distance is in the range 60 to 200 microns.

9. The disk drive of claim 1 wherein the laser light source is oriented to produce a laser beam that is substantially parallel to the back face, and the head further includes a reflective facet that bends the laser beam to be substantially normal to the ABS.

10. A head gimbal assembly for a disk drive, the head gimbal assembly comprising:
a head that comprises
a slider that includes an air bearing surface (ABS), a trailing face, and a back face that is opposite the ABS and that faces away from the ABS;
a magnetic sensor that is disposed on the trailing face;
a plurality of head bond pads that are disposed on the trailing face and that are electrically conductive; and
a laser light source that is disposed on the back face, the laser light source defining a laser light source thickness measured in a direction that is normal to the ABS; and
a suspension assembly that comprises
a load beam;
a flexure, the flexure including
a tongue, a first side of the tongue in contact with the load beam, and an opposing second side of the tongue attached to the laser light source;
a flexure bond pad shelf that is approximately parallel to the tongue; and
a plurality of flexure bond pads that are disposed on the flexure bond pad shelf and that are electrically conductive;
wherein the plurality of flexure bond pads are electrically connected to respective ones of the plurality of head bond pads;
wherein the flexure includes a plurality of bends offsetting the flexure bond pad shelf from the tongue by an offset distance measured in the direction that is normal to the ABS and being no less than the laser light source thickness;
wherein the flexure further comprises a flexure base region that is attached to the load beam, and a plurality of flexure arms, each extending from the flexure base region and adjoining to the flexure tongue at a respective one of a plurality of adjoining locations; and
wherein the plurality of bends are disposed between the flexure bond pad shelf and at least one of the plurality of adjoining locations.

11. The disk drive of claim 10 wherein each of the plurality of bends is about a bend line that is oriented substantially parallel to the trailing face.

12. A head gimbal assembly for a disk drive, the head gimbal assembly comprising:
a head that comprises
a slider that includes an air bearing surface (ABS), a trailing face, and a back face that is opposite the ABS and that faces away from the ABS;
a magnetic sensor that is disposed on the trailing face;
a plurality of head bond pads that are disposed on the trailing face and that are electrically conductive; and
a laser light source that is disposed on the back face, the laser light source defining a laser light source thickness measured in a direction that is normal to the ABS; and
a suspension assembly that comprises
a load beam;
a flexure, the flexure including
a tongue, a first side of the tongue in contact with the load beam, and an opposing second side of the tongue attached to the laser light source;
a flexure bond pad shelf that is approximately parallel to the tongue; and
a plurality of flexure bond pads that are disposed on the flexure bond pad shelf and that are electrically conductive,
wherein the plurality of flexure bond pads are electrically connected to respective ones of the plurality of head bond pads;

wherein the flexure includes a plurality of bends offsetting the flexure bond pad shelf from the tongue by an offset distance measured in the direction that is normal to the ABS and being no less than the laser light source thickness;

wherein the flexure further comprises a flexure base region that is attached to the load beam, and a plurality of flexure arms, each extending from the flexure base region and adjoining to the flexure bond pad shelf at a respective one of a plurality of adjoining locations; and wherein the plurality of bends is disposed between the flexure tongue and the plurality of adjoining locations.

13. The disk drive of claim 12 wherein each of the plurality of bends is about a bend line that is oriented substantially parallel to the trailing face.

14. The head gimbal assembly of claim 10 wherein the offset distance is in the range 60 to 200 microns.

15. The head gimbal assembly of claim 10 wherein the laser light source is oriented to produce a laser beam that is substantially parallel to the back face, and the head further includes a reflective facet that bends the laser beam to be substantially normal to the ABS.

16. The head gimbal assembly of claim 15 wherein the head further comprises a wave guide structure that is oriented substantially parallel to the trailing face, and wherein the wave guide structure includes the reflective facet.

17. The head gimbal assembly of claim 10 wherein the slider defines a slider height measured from the ABS to the back face in the direction that is normal to the ABS, and wherein the offset distance is more than 30% of the slider height.

\* \* \* \* \*